United States Patent

[11] 3,604,022

| | | | | |
|---|---|---|---|---|
| [72] | Inventor | Jack V. Smith<br>502 Racine Ave., Aurora, Colo. 80010 | | |
| [21] | Appl. No. | 825,294 | | |
| [22] | Filed | May 16, 1969 | | |
| [45] | Patented | Sept. 14, 1971 | | |

[54] FOLDABLE PLATFORM ASSEMBLY FOR VEHICLES
4 Claims, 9 Drawing Figs.

[52] U.S. Cl. ..................................................... 5/118, 5/94
[51] Int. Cl. ..................................................... A47d 7/00
[50] Field of Search ........................................... 5/94, 118;
297/442; 108/115, 159

[56] References Cited
UNITED STATES PATENTS
2,711,545  6/1955  Moore ........................... 5/94 X
3,006,001  10/1961  Llewellyn ..................... 5/118
3,126,140  3/1964  Lizan et al. ................... 108/115

Primary Examiner—Casmir A. Nunberg
Attorney—John E. Reilly

ABSTRACT: A foldable floor platform assembly has flat panel sections hingedly connected together at adjacent edges which extend to provide a generally level support area above the floor of a vehicle and fold into a compact portable form which may be carried within the vehicle. Collapsible box-shaped base units support the connected ends of the panel sections along and on both sides of the hinged connections with the free ends adapted to engage the floor surface in the vehicle to support the assembly in a generally level position.

PATENTED SEP 14 1971

INVENTOR.
Jack V. Smith
BY
John E. Reilly
ATTORNEY

INVENTOR.
Jack V. Smith
BY John E. Reilly
ATTORNEY

FOLDABLE PLATFORM ASSEMBLY FOR VEHICLES

This invention relates to accessory devices for vehicles and more particularly to a novel and improved foldable platform assembly for passenger-type vehicles and the like.

Collapsible or foldable platforms composed of hinged sections adapted to extend and retract have heretofore been placed over the floor of passenger-type vehicles, after one or more seats have been removed, to form flat support areas and thereby to adapt the vehicle for hauling or to accommodate the sleeping of persons therein. A typical example of a prior platform is shown in U.S. Pat. No. 3,006,001. Difficulties associated with these platforms generally relate to the problem of firmly supporting them in a level position without sacrificing the ease of installation and removal. Stresses are produced on the hinges by the weight of the overhead load if the panels are not adequately supported between the free ends thereof. Further, the platform assembly must be light and compact and preferably when folded should be capable of being carried by hand and be convenient to carry in the vehicle when not in use.

Accordingly, it is an object of this invention to provide a novel and improved foldable platform assembly for passenger-type vehicles which is simple in construction, compact, strong, durable and lightweight.

Another object of this invention is to provide a foldable platform assembly for vehicles which is quick and easy to install and remove and does not require hooks, catches or fasteners affixed to the vehicle body to hold it in place.

Yet a further object of this invention is to provide an extensible and foldable floor-engaging platform for vehicles which is adapted to lie in a level position to accommodate persons sleeping therein and hauling in the vehicle and the like.

It is yet a further object of this invention to provide a readily foldable hinged platform assembly having collapsible base structure disposed along portions of both sides of the hinged panel sections at connected ends in a manner to take the stress of the weight off the hinges and will fold to a fully flattened condition to permit the panel sections to fold into a compact unit.

In accordance with the present invention there is provided a plurality of relatively thin, flat panel sections forming a platform assembly shaped to fit the contour of the floor and associated sides of the vehicle when at least the rear seat cushion is removed. The platform sections are hingedly connected together at adjacent edges and supported to form a flat support area within the vehicle for hauling and sleeping purposes. Collapsible base units carried by the panel sections support the connected edges of the panel sections in the central recessed area of the vehicle and maintain them level; the free end portions of the panel sections directly engaging the vehicle body. The base units flatten prior to folding of the panel sections so as to occupy a narrow space between fully folded panel sections.

Other objects, advantages and features of the present invention will become more apparent as the description proceeds taken in conjunction with the accompanying drawings, in which.

Figure 1:
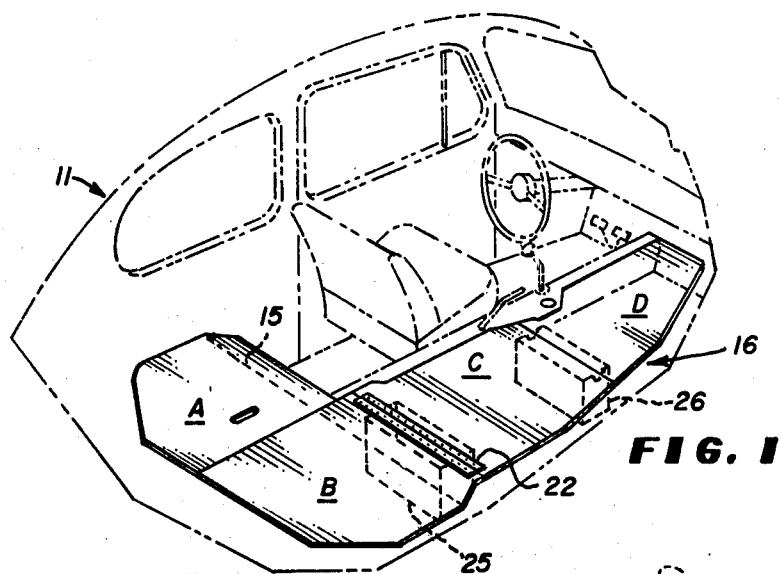
FIG. 1 is a perspective view of an extended platform assembly disposed on the floor of a vehicle having its right front seat and rear seat removed.

Referring now to the drawings, there is shown an outline of portions of a Volkswagen-type vehicle designated 11 with the right front seat and rear seat removed to exemplify a typical vehicle with which the present invention may be operatively associated. Generally, the floor portion of this vehicle has a depressed or recessed central area 12 and raised forwardly inclined front end portion 13 under the dashboard and a raised rearwardly inclined portion 14 where the seat cushions are normally located. Line 15 indicates the top edge of a metal rim which normally acts as a retainer for the rear seat cushion.

A foldable platform assembly 16 embodying features of the present invention removably seats or rests on the floor of the vehicle and in general comprises panel sections designated A, B, C and D, which are hingedly connected at adjacent edges which extend to form a level support area within the vehicle. The rearwardly disposed or back seat panel sections A and B are connected at adjacent sides by a hinge 21 secured on the undersurfaces thereof. Panel section C which is disposed along one side of the vehicle generally opposite to the driver's seat and extends somewhat rearwardly thereof is hingedly connected along its rear end to the front end of rear panel section B by a hinge 22 secured along the top surfaces thereof. A front panel section D is hingedly connected at the front end of the side panel section C by a hinge 23 secured on the undersurface of the adjacent ends of panel sections C and D. In general when the assembly is not being used these hingedly connected panel sections will fold at their hinged connections into a compact form described more fully hereinafter.

The contour of panel sections A, B, C and D generally conform to that of the floor and associated side walls of the vehicle in which they are disposed. For the Volkswagen vehicle illustrated the corners of the free ends of the rear panels A and B and front panel section D are bevelled and a notch is provided along the inside of the panels so as not to interfere with the driver controls. Panel Section A does not completely cover the area behind the driver so that a second passenger may be seated behind the driver on a box or cushion.

A collapsible base arrangement is provided for the interconnected panel sections which comprises a box-shaped base unit 25 at the hinged connections between panel sections B and C and a box-shaped base unit 26 at the hinged connections between panels C and D. These base units 25 and 26 are secured to panel sections C and D, respectively, and in the open or expanded positions extend along and on both sides of the associated connecting hinges for the panel sections so as to support both connected ends thereof. In this manner, the overhead or supported weight will be borne by the ends of the panels engaging the box-shaped units rather than by the hinges.

Figure 2:
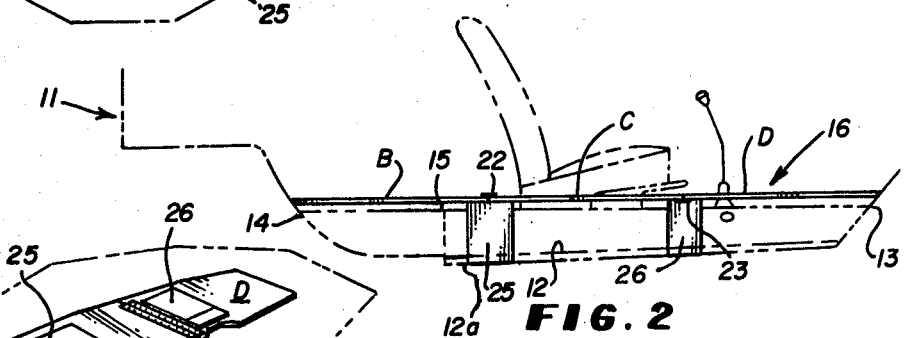
FIG. 2 is a side elevation view of the platform assembly shown in FIG. 1.
Figure 3:
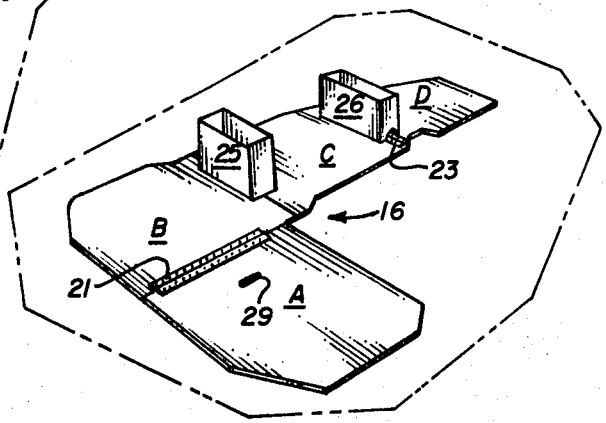
FIG. 3 is a perspective view of the extended platform assembly in an inverted position with the boxlike units forming the base arranged in the open expanded position.
Figure 5:
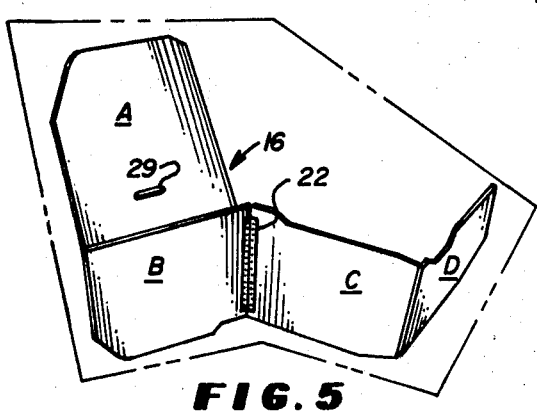
FIG. 5 is a perspective view showing the panel sections partially folded to indicate the folding pattern thereof.
Figure 6:
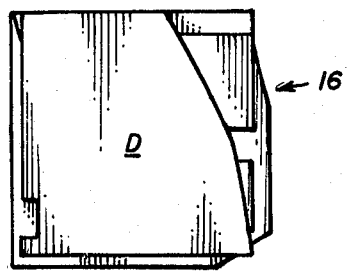
FIG. 6 is a side elevation view showing the panel sections completely folded into a compact form.

When the box-shaped base units 25 and 26 are placed in position on the vehicle floor as shown in FIGS. 1 and 3 the bottom portions thereof fit in slight recessed channel 12a which runs lengthwise of the floor. The free ends of the connected panel sections engage the raised inclined front and rear ends 13 and 14 of the vehicle and the base units engage the flat bottom central area of the floor so that the platform assembly is firmly supported. As an optional feature, panel sections A and B may be provided with two small laterally spaced hinges attached along a line parallel to the forward edges of these panel sections A and B to further secure panels in place. When the platform assembly is in place the loose half of the hinges will drop vertically to engage this rim 15 to serve as positioning members for the platform assembly. It is therefore apparent that the platform assembly is not physically attached or fastened to the vehicle when placed in the extended position as shown in FIGS. 1 and 2 so that it is easily removed when desired. The hinge 21 connecting sections A and B does not run the entire length of the panel sections and therefore will not interfere with the metal rim 15. An oblong hole 29 is cut through section A to provide a hand grip for carriage and installation and removal of the platform assembly.

Figure 7:
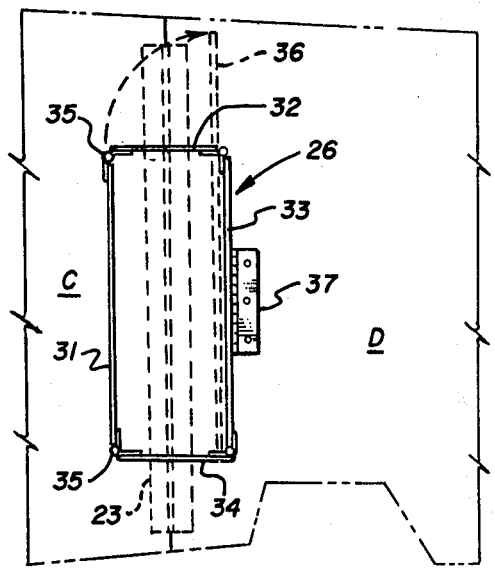
FIG. 7 is a fragmentary bottom plan view of one of the box-shaped base units with a flattened position therefor being indicated in dashed lines.
Figure 8:
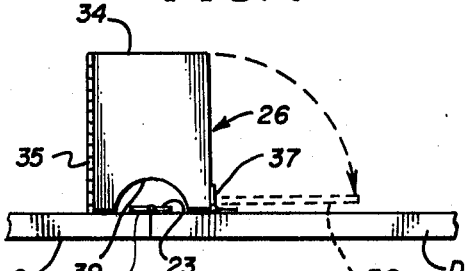
FIG. 8 is a side end elevation view of the boxlike base units shown in FIG. 7 with the folded position shown in dashed lines.
Figure 9:
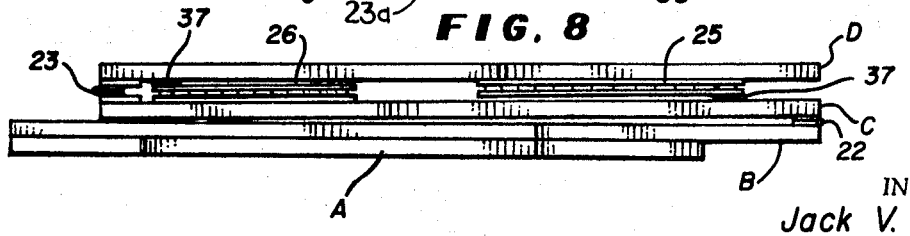
FIG. 9 is a sideview of the panel sections completely folded.

Referring now to FIGS. 7 and 8, the box-shaped base units are of a similar construction and with reference to unit 26 comprises four upright sidewalls 31, 32, 33 and 34 swingingly associated with one another at each corner by hinges 35 and open at the top and bottom so that they will swing transversely to the panel sections to collapse to a generally flattened form as shown in dashed lines 36 representing folded sidewalls 31 and 34. The sidewall 33 extending generally parallel and inwardly of the connected edge of panel section D is hingedly connected to panel section D by a hinge 37 so that the flattened assembly will fold over against panel section D as shown in dashed lines 38 in FIG. 8. The end walls 32 and 34 making up this box-shaped unit have slotted portions 39 directly above the associated hinge 23 for the panel section to provide clearance for the hinge 23. Hinges 35 for the box-shaped unit are loose so that the box-shaped units will swing down and open under the force of gravity when the panel sections are extended from the closed position. Two of the hinges 35 are folded backward when box 26 is opened and therefore will open only 90° to stop the box in the extended position.

Figure 4:
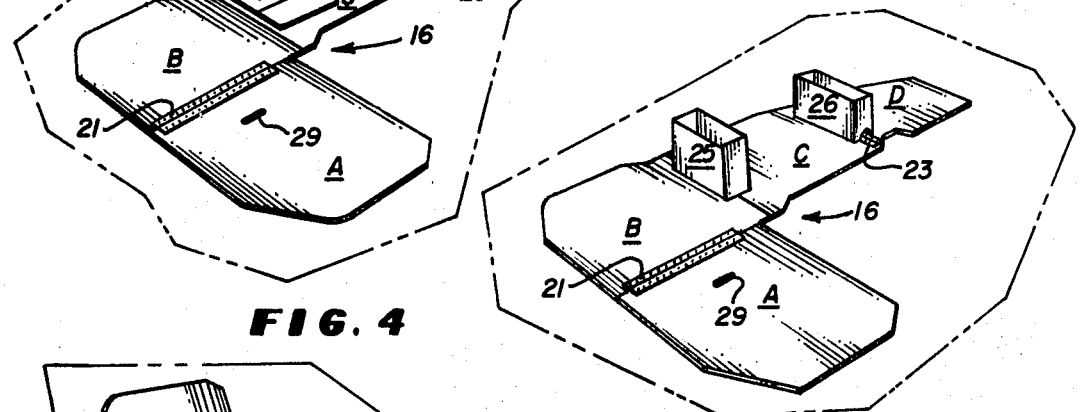
FIG. 4 is a perspective view showing the inverted platform assembly with the boxlike units collapsed before folding the panel sections.

In the folding procedure for the panel sections after the base units have been collapsed as shown in FIG. 4, they will fold so that the front panel section D folds toward the underside of side panel section C, side panel C folds toward the top side of rear panel section B and the rear panel section A folds toward the underside of rear panel section B. The hinge 23 connecting panels C and D is raised slightly along the adjacent edges by shims or spacers 23a to permit room for the collapsed base units 25 and 26 and still allow complete full folding of panel sections C and D to a generally parallel position relative to one another with the box-shaped units flattened therebetween.

The panel sections of the assembly are disposed so that it may be partially extended and partially folded with the right front seat in place. Rear panel sections A and B may be extended as shown in FIGS. 1 and 2 and side and front panel sections C and D folded on top of panel section B so that a portion of the extended assembly can be carried in place with only the rear seat cushion removed. As required the right front seat can be removed and panel sections C and D extended to attain maximum surface area from the platform assembly.

The platform assembly above described can be further expanded to provide sleeping space for two people by adding additional panel sections along the panel sections C and D to cover the area usually occupied by the driver's seat. Each added panel section would use the same basic folding pattern. Section D would be hinged on the underside immediately ahead of the brake pedal. The edge of this hinged flap would rest on the floorboard and provide support for this section which is provided by floorboard 13 on the opposite side. This section would be generally shorter than the other sections C and D because of the brake pedals on the vehicle. One possibility is to provide this additional convenience with a loose pin-type connection between the added panel sections and panel sections A and C.

Although the present invention has been described with a certain degree of particularity, it is understood that the present disclosure has been made only by way of example and that changes in details of structure and system components may be made without departing from the spirit thereof.

What is claimed is:

1. A foldable platform assembly for vehicles comprising two rear panel sections hingedly connected together at adjacent side edges, a side panel hingedly connected at its rear end to the front end of one of said rear panels and a front panel section hingedly connected at its rear end to the front end of said side panel, said panel sections being disposed to extend to provide a generally flat support area within the vehicle above the floor and fold into a compact form, a collapsible base for supporting the panel sections having portions disposed to extend along and beyond the sides of the hinged connections between said one rear panel section and said side panel section and said front panel section to support the extended panel sections generally level above the floor of the vehicle with the free ends of the panel sections engaging a portion of the vehicle body, said base being collapsible to a flattened condition and foldable against a supporting panel section therefor.

2. A foldable platform assembly as set forth in claim 1 wherein said front panel section folds towards the underside of said side panel section.

3. A foldable platform assembly as set forth in claim 1 wherein said side panel section folds towards the top side of said rear panel section to which it is hingedly attached.

4. A foldable platform assembly as set forth in claim 1 wherein said other of said rear panel sections folds toward the underside of said one rear panel section.